(12) United States Patent
Knoblauch (10) Patent No.: US 8,267,232 B2
(45) Date of Patent: Sep. 18, 2012

(54) CLUTCH ARRANGEMENT FOR MOTOR VEHICLE TRANSMISSION AND METHOD FOR ENGAGING AND DISENGAGING A GEARSPEED

(75) Inventor: Daniel Knoblauch, Untergruppenbach (DE)

(73) Assignee: GETRAG Getriebe- und Zahnradfabrik Hermann Hagenmeyer GmbH & Cie KG, Untergruppenbach (DE)

( * ) Notice: Subject to any disclaimer, the term of this patent is extended or adjusted under 35 U.S.C. 154(b) by 953 days.

(21) Appl. No.: 12/162,333

(22) PCT Filed: Jan. 11, 2007

(86) PCT No.: PCT/EP2007/000220
§ 371 (c)(1),
(2), (4) Date: Dec. 8, 2008

(87) PCT Pub. No.: WO2007/085348
PCT Pub. Date: Aug. 2, 2007

(65) Prior Publication Data
US 2009/0127059 A1    May 21, 2009

(30) Foreign Application Priority Data

Jan. 25, 2006 (DE) .......................... 10 2006 004 125
May 16, 2006 (DE) ...................... 20 2006 008 131 U (51) Int. Cl.
*F16D 27/01* (2006.01)
*F16D 27/118* (2006.01)

(52) U.S. Cl. .................. 192/48.2; 192/69.9; 192/84.31; 192/84.92; 74/335

(58) Field of Classification Search ................. 192/48.2, 192/69.9, 84.31, 84.92; 74/335
See application file for complete search history.

(56) References Cited

U.S. PATENT DOCUMENTS

| 4,534,455 | A | * | 8/1985 | Fujikawa | 192/69.42 |
| 4,561,520 | A | * | 12/1985 | Fogelberg | 192/84.92 |
| 4,570,768 | A | * | 2/1986 | Nishimura et al. | 192/48.2 |
| 5,765,671 | A | * | 6/1998 | Endo et al. | 192/48.2 |
| 5,802,915 | A | * | 9/1998 | Organek et al. | 192/69.91 |
| 6,454,071 | B1 | * | 9/2002 | Peter et al. | 192/69.9 |

(Continued)

FOREIGN PATENT DOCUMENTS

DE    100 07 847 A1    8/2001

(Continued)

*Primary Examiner* — David D Le
*Assistant Examiner* — Jacob S Scott
(74) *Attorney, Agent, or Firm* — Knobbe, Martens, Olson & Bear, LLP (57) ABSTRACT

A clutch arrangement (10) for a motor vehicle transmission (80) is proposed for connecting a shaft (12) to a rotational element (14), in particular to a freely moving wheel (14), which is mounted thereon, wherein the clutch arrangement (10) has:
 a sliding sleeve (22) which is connected in a rotationally fixed fashion to the shaft (12) and is mounted in an axially displaceable fashion on the shaft (12) between a closed position and an open position and has a first sliding toothing (24);
 a clutch element (26) which is connected in a rotationally fixed fashion to the rotational element (14) and has a second sliding toothing (28) into which the first sliding toothing (24) can be inserted axially in the closing direction (30) in order to connect the rotational element (14) to the shaft (12) in the closed position; and
 an actuator arrangement (40) for axially sliding the sliding sleeve (22).

In this context, the actuator arrangement (40) has an electromagnet arrangement (46) which can be actuated in order to slide the sliding sleeve (22) axially (FIG. 1).

27 Claims, 6 Drawing Sheets

U.S. PATENT DOCUMENTS

6,886,425 B2 * 5/2005 Petzold ............... 192/84.92
7,461,569 B2 * 12/2008 Bianchi ................ 74/335

FOREIGN PATENT DOCUMENTS

| EP | 0 793 034 A2 | 9/1997 |
|----|----|----|
| EP | 0 700 805 B1 | 2/1999 |
| EP | 1 628 026 A | 2/2006 |
| WO | WO 86/05850 A | 10/1986 |
| WO | WO 01/63151 A | 8/2001 |
| WO | WO 2004/109136 | 12/2004 |

* cited by examiner

CLUTCH ARRANGEMENT FOR MOTOR VEHICLE TRANSMISSION AND METHOD FOR ENGAGING AND DISENGAGING A GEARSPEED

CROSS REFERENCE TO RELATED APPLICATIONS

This application is a PCT National Phase application of International patent application PCT/EP2007/000220, filed on Jan. 11, 2007, which claims the priority of Germany patent application DE 10 2006 004 125, filed Jan. 25, 2006 and German Patent application DE 20 2006 008 131, filed May 16, 2006. The disclosures of the above-referenced applications are hereby expressly incorporated by reference in their entireties.

BACKGROUND OF THE INVENTION

The present invention relates to a clutch arrangement for a motor vehicle transmission, for connecting a shaft to a rotational element, in particular to a freely moving wheel, which is mounted thereon, wherein the clutch arrangement has:
- a sliding sleeve which is connected in a rotationally fixed fashion to the shaft and is mounted in an axially displaceable fashion on the shaft between a closed position and an open position and has a first sliding toothing;
- a clutch element which is connected in a rotationally fixed fashion to the rotational element and has a second sliding toothing into which the first sliding toothing can be inserted axially in the closing direction in order to connect the rotational element to the shaft in the closed position; and
- an actuator arrangement for axially sliding the sliding sleeve.

In addition, the present invention relates to a method for engaging a gearspeed of a transmission, in particular of a motor vehicle transmission, specifically by axially sliding a sliding sleeve with respect to a clutch element, and a corresponding method for disengaging such a gearspeed.

Clutch arrangements of the type referred to above are generally known. They are generally used in what are referred to as manual shift transmissions, in automatic transmissions (ASG) and in double clutch transmissions (DKG). However, clutch arrangements of the aforesaid type can also be used for other connections between a shaft and a rotational element, for example between two shafts or the like.

The clutch element with the second sliding toothing can be formed separately from the rotational element and be fixedly connected to it. Alternatively it is also possible to form the clutch element in one piece with the rotational element.

In the case of the actuator arrangements, hydraulic actuators are known which hydraulically generate the force for axially sliding the sliding sleeve. In addition, what are referred to as electromechanical actuators are known in which the force of an electric motor is used to slide the sliding sleeve axially. In this context, a rotational/translational converter such as a shift drum is frequently used.

Document WO 86/05850 discloses an electromagnetic permanent magnet coupling for connecting two shafts of a machine tool etc., the equilibrium of forces of which in the closed state does not trigger a change of position even if there is a power failure but reduces the closing force of the clutch here in such a way that it can open in the case of inadmissible torques.

Document DE 100 07 847 A1 discloses an electromagnetic shifting device for a transmission in which a dog for connecting a shaft to a freely moving wheel can be slid axially by means of an electromagnetic device.

However, these known clutch arrangements are subject to relatively high wear or are not functionally expedient.

BRIEF SUMMARY OF THE INVENTION

Against the above background, the object of the present invention is to specify an improved clutch arrangement for motor vehicle transmissions.

This object is achieved with the clutch arrangement as mentioned at the beginning in that the actuator arrangement has an electromagnet arrangement which can be actuated in order to slide the sliding sleeve axially.

The shifting forces for axially sliding the sliding sleeve can be transmitted in a contactless fashion with an electromagnet arrangement as the actuator. Accordingly, the clutch arrangement according to the invention is defined by a low degree of wear.

The clutch arrangement is particularly preferably not equipped with a synchronization means (i.e. a synchronization ring) so that the shifting forces are comparatively low.

The above object is also achieved by means of a method for engaging a gearspeed of a transmission, in particular of a motor vehicle transmission, specifically by axially sliding a sliding sleeve with respect to a clutch element by means of an electromagnet arrangement, wherein the electromagnet arrangement has a magnet housing, an electric coil arrangement and a permanent magnet, having the steps of energizing the coil arrangement so that a first magnetic circuit is set up across the magnet housing, the permanent magnet, a magnetizable armature section of the sliding sleeve, a pole element of the clutch element and an axial air gap between the armature section and the pole element, and of reducing the energization when or after the air gap closes, wherein the permanent magnet maintains a magnetic holding flux across the first magnetic circuit in order to hold the sliding sleeve axially in the engaged position.

The above object is also achieved by means of a method for disengaging a gearspeed of a transmission, in particular of a motor vehicle transmission, specifically by axially sliding a sliding sleeve with respect to a clutch element by means of an electromagnet arrangement, wherein the electromagnet arrangement has a magnet housing, an electric coil arrangement and a permanent magnet, and wherein the sliding sleeve is held axially by means of a holding flux which is generated by the permanent magnet across a first magnetic circuit, having the steps of energizing the coil arrangement so that the magnetic flux generated by the permanent magnet is forced into a second magnetic circuit which is set up across the magnet housing, the permanent magnet and a magnetizable armature section of the sliding sleeve and by means of which the sliding sleeve can be held axially in the disengaged position.

The object is therefore achieved completely.

In one particularly preferred embodiment, the electromagnet arrangement has a permanent magnet arrangement and a magnet housing which are arranged in such a way that with a magnetizable armature section of the sliding sleeve in the closed and/or open position they can form a magnetic circuit by means of which the sliding sleeve is held axially.

The permanent magnet arrangement generates here a magnetic flux in the circuit so that the sliding sleeve can be held axially in the closed and/or open position (i.e. in at least one end position) without continuous supply of energy.

It is particularly advantageous here if the magnet housing and the permanent magnet arrangement are fixed to a housing of the motor vehicle transmission.

In this context, the magnet system can be pre-mounted on the transmission housing. A compact design is possible.

According to a further preferred embodiment, the permanent magnet arrangement has an annular, radially magnetized permanent magnet.

Radial magnetization has the advantage that the magnetic flux which is generated by the permanent magnet can be used both for a holding function in the open position and for a holding function in the closed position. In contrast, in the case of axial magnetization a holding function is generally possible only in one of the two end positions.

According to an alternative embodiment, the permanent magnet arrangement has an axially magnetized permanent magnet.

This may be in particular of annular design.

It is particularly preferred here if the permanent magnet arrangement has two, in particular, axially magnetized permanent magnets which are oppositely poled.

In this embodiment it is possible to assign one of the permanent magnets to the closed position and the other permanent magnet to the open position and/or to add the magnetic forces of the magnets in these positions so that in each case an optimized holding force can be implemented in these positions.

According to a further preferred embodiment, a soft-magnetic intermediate section is arranged here between the two axially magnetized permanent magnets.

In this way it is possible to combine magnetic fluxes of the two permanent magnets across the intermediate section so that in total a significantly higher holding force can be applied by means of the two permanent magnets. In particular, in this embodiment the magnetic forces of the two permanent magnets can be used to implement the respective holding force both in the open position and in the closed position.

In addition it is advantageous overall if the magnet housing is of annular design and has two radially inwardly directed annular limbs between which the permanent magnet arrangement is arranged.

In this embodiment it is possible to form a magnetic circuit by means of the permanent magnet arrangement and an annular limb. It is also possible to configure a second magnetic circuit by means of the other annular limb and the permanent magnet arrangement. As a result, the functionality can be increased overall.

It is particularly advantageous here if an intermediate space which is filled with a nonmagnetic medium is arranged between an annular limb and a permanent magnet of the permanent magnet arrangement.

In this way it is possible to prevent a magnetic short circuit between the permanent magnet and the annular limb. The nonmagnetic medium can in the simplest case be air. However, it is also possible to use a nonmagnetic (amagnetic) material such as, for example, stainless steel, plastic or the like.

In addition it is advantageous here if the permanent magnet has a non-magnetic carrier to which the permanent magnet is fixed, in which case the carrier is arranged in the intermediate space.

In this embodiment, on the one hand the permanent magnet arrangement can be conveniently manufactured. On the other hand, the carrier of the permanent magnet arrangement can be used to "fill in" the intermediate space.

Overall it is also preferred if a coil arrangement of the electromagnet arrangement is arranged between the two annular limbs of the magnet housing.

The coil arrangement can be energized in a manner known per se in order to generate a magnetic flux across the magnet housing and as a result generate a magnetic field and therefore shifting forces. As a result of the arrangement of the coil arrangement between the two annular limbs, an overall compact design can be achieved.

It is particularly preferred here if the permanent magnet is arranged between the coil arrangement and the intermediate space.

In this way it is possible to configure two magnetic circuits in a compact and comparatively simple way. In particular, the permanent magnet here may be used for a holding function both in the closed position and in the open position.

In an alternative embodiment, the coil arrangement is arranged offset here in the radial direction with respect to the permanent magnet arrangement between the two annular limbs.

This embodiment is advantageous in particular when axially magnetized permanent magnets are used, and it permits an axially compact design.

In this context, the cross section which can be implemented for the coil arrangement can be maximized so that said coil arrangement can generate high forces.

According to an alternative embodiment, the coil arrangement is arranged offset in the axial direction with respect to the permanent magnet arrangement between the two annular limbs.

In this embodiment, in particular a radially compact design can be implemented. In addition, this embodiment is appropriate in particular when a radially magnetized permanent magnet is used.

It is also preferred if an annular limb is magnetically coupled across a first radial air gap to a first pole element which is fixed to the clutch element.

The first pole element can be formed separately from the clutch element, but it can also be formed in one piece with the clutch element.

The fact that the coupling occurs across a radial air gap avoids axial forces between the fixed part of the electromagnet arrangement and the rotating part of the electromagnet arrangement. This permits bearing loads to be reduced.

It is particularly preferred in this context if the first pole element is magnetically coupled across a first axial air gap to an armature section which is fixed to the sliding sleeve.

In this way, the axial force which is necessary to axially offset the sliding sleeve can be applied directly across an axial air gap.

In addition it is advantageous if a further annular limb is magnetically coupled across a second radial air gap to an armature section which is fixed to the sliding sleeve.

It is also possible in this context to reduce, preferably avoid, axial forces between the rotating and fixed parts.

According to an alternative embodiment, a further annular limb is magnetically coupled to a second pole element which is magnetically coupled across a second axial air gap to an armature section which is fixed to the sliding sleeve.

In this embodiment, the axial force for sliding the sliding sleeve can be applied in the opposite direction to the closing direction across an axial air gap. In this context it is possible, if appropriate, to dispense with a spring or the like which prestresses the sliding sleeve in the opposite direction to the closing direction.

If the sliding sleeve is not prestressed elastically in the opposite direction to the closing direction, it is possible, in the closed position, for the full magnetic force to be available for the holding function and this magnetic force is therefore not reduced by a spring force.

It is particularly preferred in this context if the second pole element is connected in a rotationally fixed fashion to the shaft and is magnetically coupled across a radial air gap to the further annular limb.

Since the second pole element and the magnetizable armature section of the sliding sleeve are consequently connected to one another in a rotationally fixed fashion, the friction is reduced.

Of course, it is also preferred overall if a permanent magnet of the permanent magnet arrangement is magnetically coupled across a third radial air gap to an armature section which is fixed to the sliding sleeve.

If the coupling between fixed parts and rotating parts for setting up a magnetic circuit is carried out in each case across a radial air gap, the radial forces which are produced cancel one another out owing to the symmetrical conditions.

As a result, in the two end positions of the clutch arrangement bearing loads and friction losses as well as wear owing to the electromagnet arrangement can be avoided.

Overall, it is also advantageous if a soft-magnetic intermediate section which is arranged between two permanent magnets of the permanent magnet arrangement is magnetically coupled across a third radial air gap to an armature section which is fixed to the sliding sleeve.

In this embodiment, it is advantageously possible to add the magnetic forces of the two permanent magnets across the intermediate section and to transmit them to the armature section across the third radial air gap.

It is particularly preferred if the electromagnet arrangement is configured to set up a first and a second magnetic circuit, wherein, when the first magnetic circuit is set up, a first magnetic force is applied to an armature section of the sliding sleeve, and said magnetic force slides the sliding sleeve in the closing direction.

Accordingly, it is preferred here if, when the second magnetic circuit is set up, a second magnetic force is applied to an armature section of the sliding sleeve, and said magnetic force slides the sliding sleeve in the opposite direction to the closing direction.

According to one alternative preferred embodiment, the electromagnet arrangement is configured to set up, in the closed and/or open position of the sliding sleeve, a first magnetic holding circuit by means of one of two permanent magnets and at the same time a parallel second magnetic holding circuit by means of the second permanent magnet.

In this embodiment it is possible to use the respective magnetic forces of the two permanent magnets simultaneously to implement a respective holding force in the closed and/or open position.

The clutch arrangements according to the invention can advantageously be integrated into a clutch assembly which has a first and a second clutch arrangement. The first clutch arrangement is configured to connect the shaft to a first rotational element by means of a first sliding sleeve. The second clutch arrangement is configured to connect the shaft to a second rotational element by means of a second sliding sleeve.

It is of particular advantage here if the electromagnet arrangements of the clutch arrangements each have a permanent magnet arrangement and a magnet housing which are arranged in such a way that with a magnetizable armature section of the respective sliding sleeve in the closed and/or open position they can form a magnetic circuit by means of which the respective sliding sleeve is held axially, wherein the magnet housings are embodied in an annular fashion and have two radially inwardly directed annular limbs between which the permanent magnet arrangements are arranged.

It is self-evident here that the magnet housings of the two clutch arrangements are preferably integrated with one another.

It is a particular advantage therefore if the magnet housings of the two clutch arrangements share a common annular limb and/or a second pole element.

In this embodiment, the two clutch arrangements can be arranged directly adjacent to one another in the axial direction, and the common annular limb and/or the second pole element are preferably arranged in the axial center position of the clutch assembly.

According to one preferred embodiment of the method according to the invention for disengaging a gearspeed, the sliding sleeve is slid into the disengaged position by means of a magnetic force which acts across a radial air gap between the magnetizable armature section and a limb of the magnet housing.

Alternatively, in the method according to the invention for disengaging a gearspeed it is possible to provide that the sliding sleeve is slid into the disengaged position by means of a magnetic force, and said sliding sleeve acts across an axial air gap between the magnetizable armature section and a second pole element which is magnetically coupled to a limb of the magnet housing.

The second pole element is preferably connected to the shaft in a rotationally fixed fashion. For example, the second pole element may be secured to the guide sleeve 20, to a gear wheel which is fixedly connected to the shaft 12, or directly to the shaft 12, or may be embodied in one piece with one of these parts.

The first and second pole elements are arranged in this embodiment in such a way that the magnetizable armature section can be moved to and fro axially between them.

In this embodiment, it is generally not necessary for a prestressing force to be provided in the opposite direction to the engagement direction by means of a mechanical energy store. For this reason, in the engaged state, the full magnetic force can be available for the holding function. In contrast, in this context the amount of force available for the disengagement process is minus the spring force which is not available.

In particular, in the first alternative embodiment in which the sliding sleeve is disengaged by means of a magnetic force which acts across a radial air gap, it is particularly preferred if the sliding sleeve is prestressed in the opposite direction to the engagement direction by means of a mechanical energy store.

As a result, in particular reliable disengagement of the gearspeed can be achieved.

In particular it is advantageous if, in the methods according to the invention, the magnet housing and the permanent magnet are arranged fixed to the housing and are connected to the first pole element or the armature section across a radial air gap.

Overall, with the clutch arrangement according to the invention or the method according to the invention it is possible to achieve at least one of the following advantages:

compact design,
contactless transmission of shifting force between the rotating parts and parts which are fixed to the housing,
integration of functions by virtue of the fact that the sliding sleeve is embodied as a magnet armature,
premounting is made possible by virtue of the fact that the magnet system which is fixed to the housing can be pre-mounted on the transmission housing,
wear-free actuator system,
relatively simple design, and
easy adjustment: defined end position.

It is self-evident that the features which are mentioned above and those which are to be explained below can be used not only in the respectively specified combination but also in other combinations or alone without departing from the scope of the present invention.

BRIEF DESCRIPTION OF THE SEVERAL VIEWS OF THE DRAWING

Exemplary embodiments of the invention are illustrated in the drawing and will be explained in more detail in the following description, in which.

DETAILED DESCRIPTION OF THE INVENTION

Figure 1:
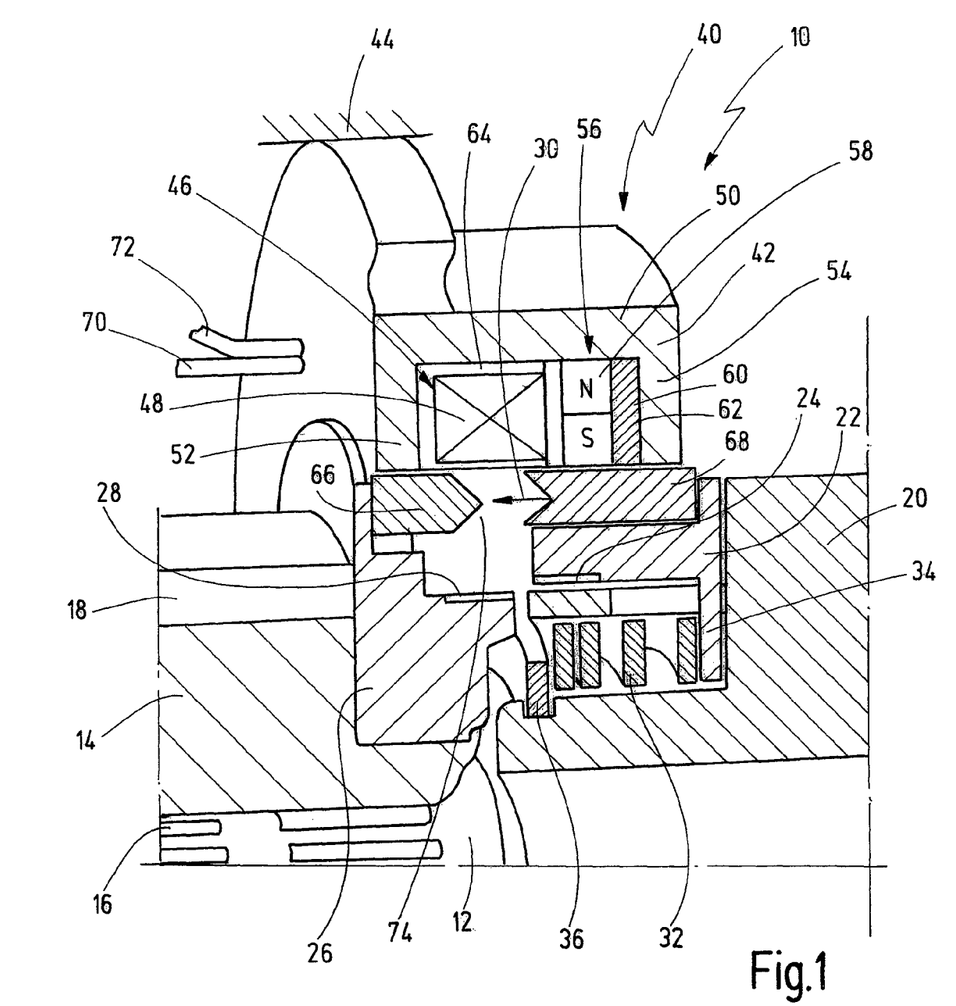
FIG. 1 shows a perspective schematic part-sectional view through a clutch arrangement according to an embodiment of the present invention.

In FIG. 1, a clutch arrangement according to an embodiment of the present invention is denoted in a general way by 10.

The clutch arrangement 10 serves to connect a shaft 12 to a rotational element such as a freely moving wheel 14, or to disconnect the connection.

The freely moving wheel 14 is rotatably mounted on the shaft 12, for example by means of schematically shown needle bearings 16.

The freely moving wheel 14 has a spur toothing 18 which can, for example, enter into engagement with a corresponding toothing of a fixed wheel on a parallel shaft.

A guide sleeve 20 is fixed to the shaft 12. The guide sleeve 20 can be embodied separately from the shaft 12 or embodied in one piece with it.

The guide sleeve 20 serves to mount a sliding sleeve 22 in an axially displaceable fashion. The sliding sleeve 22 has here a shifting toothing, for example an inner toothing 24, as illustrated.

A clutch element 26 is fixed to the freely moving wheel 14. Said clutch element 26 may be manufactured separately from the freely moving wheel 14 and be fixed to it. However, it can also be embodied in one piece with the freely moving wheel 14.

The clutch element 26 has a corresponding shifting toothing, here an external toothing 28.

If the sliding sleeve 22 is slid in the axial direction (for example in the closing direction 30 in FIG. 1), the internal toothing 24 of the sliding sleeve 22 is introduced into the external toothing 28 of the clutch element 26 so that the shaft 12 and the freely moving wheel 14 are connected to one another in a rotationally fixed fashion. When the sliding sleeve 22 is pulled back in the opposite direction to the shifting direction 30, the toothings 24, 28 disengage so that the freely moving wheel 14 can be freely rotated with respect to the shaft 12.

It is self-evident that the sliding sleeve 22 is connected to the shaft 12 (the guide sleeve 20) in a rotationally fixed fashion.

The sliding sleeve 22 is shown in FIG. 1 in an open position, that is to say in a position in which the toothings 24, 28 are disengaged. The sliding sleeve 22 is prestressed into this open position by means of a mechanical energy store, by means of a spring 32 in the present case. For this purpose, the sliding sleeve 22 has a radial web 34 against which an end of the spring 32 bears. On the other hand, a securing ring 36, against which the other end of the spring 32 bears, is fixed to the guide sleeve 20.

In order to slide the sliding sleeve 22 axially with respect to the guide sleeve 20, an actuator arrangement 40 is provided.

The actuator arrangement 40 includes a generally annular magnet housing 42 which is fixed to a transmission housing 44. The actuator arrangement 40 also includes an electromagnet arrangement 46. This in turn includes an electric coil arrangement in the form of an annular coil 48.

The magnet housing 42 has an axial annular web 50, as well as a first radial annular limb 52 and a second radial annular limb 54. The two annular limbs 52, 54 protrude inward from the axial annular web 50. Consequently, the magnet housing has an approximately U-shaped cross section.

On the one hand, the coil 48 is arranged radially inside the axial annular web 50 between the two annular limbs 52, 54. On the other hand, a permanent magnet arrangement 56 which has a permanent magnet 58 is arranged between them. The permanent magnet 58 is embodied as an annular magnet which is radially magnetized so that one pole is radially on the outside and one pole is radially on the inside.

The permanent magnet arrangement 56 also includes a carrier 60 composed of a nonmagnetic material. The permanent magnet arrangement 56 is arranged adjacent to the second annular limb 54 in such a way that the carrier 60 keeps the permanent magnet 58 spaced apart from the second annular limb 54. In other words, an intermediate space 62, which is filled with a nonmagnetic material (the carrier 60 in the present case) is formed between the second annular limb 54 and the permanent magnet 56.

The coil 48 is wound in a manner known per se onto a coil former 64. The coil former 64 can be manufactured from plastic, for example from POM or from some other nonmagnetizable material such as, for example, austenitic stainless steel.

A pole element 66 made of a magnetizable material is fixedly connected to the coupling element 26. The pole element 66 rests here radially within the first annular limb 52 and is magnetically coupled to it across a narrow radial air gap (not denoted in more detail). In a corresponding way, an armature section 68 composed of a magnetizable material is fixed to the sliding sleeve 22. In the open position shown in FIG. 1, the armature section 68 is located radially inside the second annular limb 54 and extends axially in the direction of the pole element 66. Further, the armature section 68 is also located radially inside the permanent magnet 58 or the permanent magnet arrangement 56.

In the open position shown, an axial air gap 74 is formed between an axial end side of the pole element 66 and an axial end side of the armature section 68. The end sides which lie opposite one another can be embodied here such that they run conically to a tip so that a relatively strong magnetic force can be achieved even with a comparatively large stroke.

The pole element 66 and the armature section 68 are, as stated, formed from a magnetizable material. They are preferably embodied separately from the coil element 26 and/or the sliding sleeve 22. However, it is also generally conceivable to embody the pole element 66 in one piece with the coupling element 26, and to embody the armature section 58 in one piece with the sliding sleeve 22.

In addition, 70 and 72 indicate electrical feed lines which serve to energize the coil 48.

It is apparent that the clutch arrangement 10 does not include any separate synchronization means such as, for example, a synchronizing ring. The clutch arrangement 10 therefore operates in the manner of a dog clutch. The forces which are necessary here to engage the toothings 24, 28 are relatively small compared to conventional synchronizing clutches. The synchronization can be performed here by other means. In the case of a transmission for a vehicle which is driven by an electric motor, the synchronization can, if appropriate, be carried out by means of the electromotive drive. The same applies in the case of what are referred to as hybrid drives. However, it is also possible to provide other means for synchronization, such as for example brakes or the like.

However it is also conceivable to monitor the relative rotational positions of the shaft 12 and freely moving wheel 14 and to actuate the clutch arrangement 10 when there is a suitable relative rotational position, in order to avoid scratching and the like.

In addition it is, of course, also possible to equip a clutch arrangement according to the invention with synchronizing means (synchronizing ring).

Figure 2:
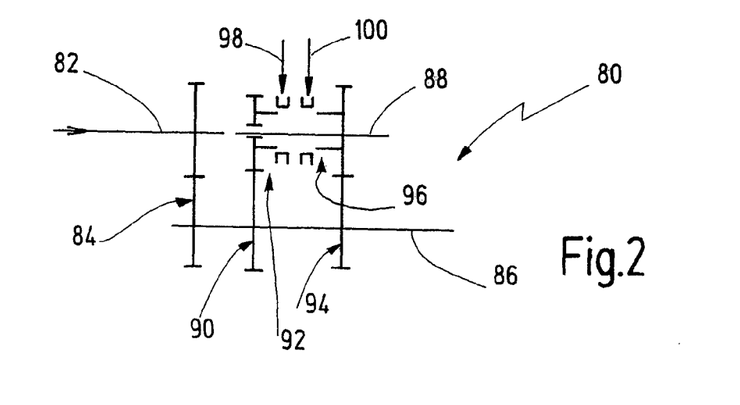
FIG. 2 is a schematic illustration of a motor vehicle transmission in which the clutch arrangement according to the invention can be used.

FIG. 2 illustrates by way of example a motor vehicle transmission for which the clutch arrangement 10 in FIG. 1 can be used. The transmission 80 is illustrated, for example, as a transmission for longitudinal installation, and it has two gearspeeds. However, it is also possible to use the clutch arrangement 10 in transmissions with a plurality of gearspeeds.

The clutch arrangement 10 can preferably also be used in a transmission which is configured as a 2-speed transmission, specifically for connecting to an electric motor as a drive motor for the motor vehicle. Such a drive train is described in German utility model application 20 2005 019 438.7, whose contents are intended to be completely incorporated here through reference.

However, the illustrated transmission 80 is, as stated, a transmission which is suitable for longitudinal installation and which includes an input shaft 82 which is connected across a constant wheel set 84 to a lay shaft 86. In addition, the transmission 80 has an output shaft 88. A first wheel set 90 with a freely moving wheel and a fixed wheel and a second wheel set 94 with a freely moving wheel and a fixed wheel serve to illustrate the respective gearspeeds of the transmission 80. The freely moving wheel of the wheel set 90 can be connected to the output shaft 88 by means of a first clutch 92. The freely moving wheel of the second wheel set 94 can be connected to the output shaft 88 by means of a second clutch 96.

A first and a second actuator arrangement 98, 100, respectively, serve to activate the clutches 92, 96.

The first clutch 92 and the first actuator arrangement 98 can be formed by a clutch arrangement 10 in FIG. 1. Correspondingly, the second clutch 96 and the second actuator arrangement 100 can be formed by a clutch arrangement 10 in FIG. 1.

Figure 3:
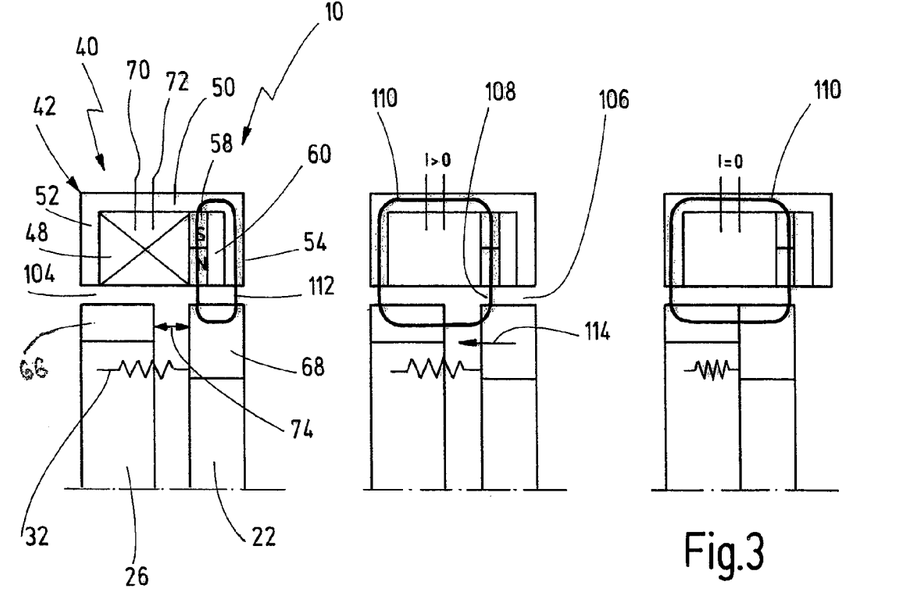
FIG. 3 shows three phases during the engagement of a gearspeed by means of a clutch arrangement according to the invention.
Figure 4:
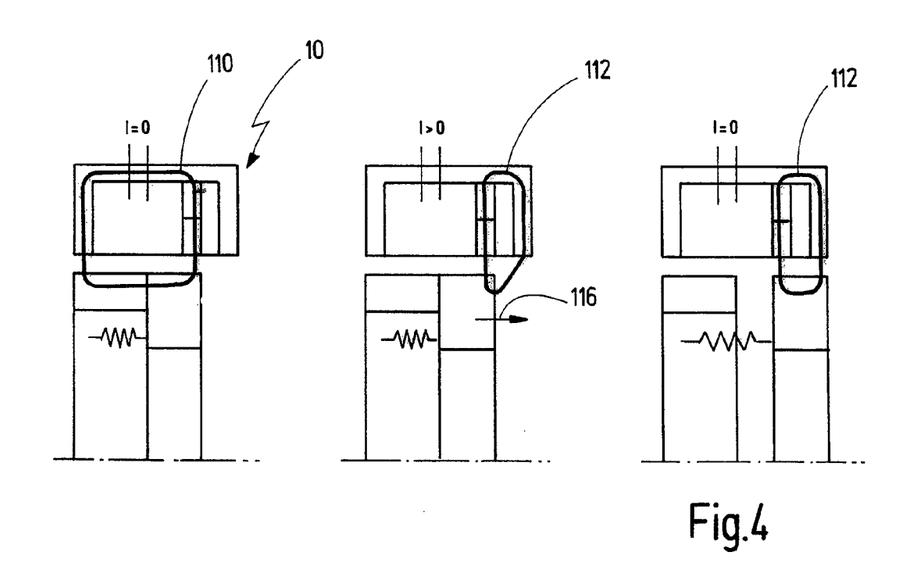
FIG. 4 shows three phases during the disengagement of a gearspeed by means of a clutch arrangement according to the invention.

FIG. 3 shows the engagement of a gearspeed or the closing of a clutch arrangement according to the invention. In a corresponding way, FIG. 4 shows the disengagement of a gearspeed with a clutch arrangement 10 according to the invention. The basic design and the basic method of the clutch arrangement 10 in FIGS. 3 and 4 corresponds to that in FIG. 1. Identical elements are therefore provided with identical reference symbols.

In addition, in the left-hand illustration in FIG. 3, the clutch arrangement 10 is shown in an open position. It is apparent that a first radial air gap 104 is set up between the first annular limb 52 and the pole element 66. In addition, a second radial air gap 106 is set up between the armature section 68 and the second annular limb 54. As is shown in the central illustration in FIG. 3, in the open position a third radial air gap 108 is also set up between the permanent magnet 58 and the armature section 68.

A position of rest in which the coil 48 is not energized is shown on the left in FIG. 3. The current I which is conducted across the electrical leads 70, 72 is zero amps. The permanent magnet 58 generates a magnetic flux which sets up a magnetic circuit 112, referred to below as the second magnetic circuit 112, across the axial annular web 50, the second annular limb 54 and the armature section 68.

The sliding sleeve 22 is held in the disengaged position by means of this second magnetic circuit 112. The axial forces which, in the end position shown, are applied to the rotating part by the fixed part of the electromagnet arrangement are, however, relatively small or even zero. It is therefore preferably provided that the sliding sleeve 22 is axially prestressed into the disengaged position by means of the spring 32.

In order to engage the gearspeed, the coil 48 is now energized, which is represented in the center of FIG. 3 (I>0).

In this context, as a result of the action of the coil 48 a magnetic flux is generated by means of which a first magnetic circuit 110 is set up, which magnetic circuit 110 is set up by the first annular limb 52 across the pole element 66, the axial air gap 74, the armature section 68, the permanent magnet 58 and the axial annular web 50.

The circuit 110 generates a first magnetic force 114 in the axial direction between the pole element 66 and the armature section 68 so that the armature section 68 is as a result slid axially, specifically counter to the force of the spring 32. It is self-evident here that the clutch element 26 cannot be slid axially.

In this context, the toothing 24 (see FIG. 1) then engages in the toothing 28 of the clutch element 26 and in doing so forms the positive locking between the freely moving wheel 14 and the shaft 12. Finally, the armature section 68 comes to bear against the pole element 66, as is illustrated on the right in FIG. 3. The end position "gearspeed engaged" is reached.

The current can now be switched off (I=0). A magnetic flux, which maintains the first magnetic circuit 110, is maintained in this case by the permanent magnet 58. The sliding sleeve 22 is therefore held axially in the engaged position (closed position), specifically counter to the prestress of the spring 32.

In this context, the axial forces between the fixed system and the rotating system of the clutch arrangement 10 approach zero. The radial forces between them cancel one another out entirely so that the wear and the bearing loading are significantly reduced.

In order to disengage the gearspeed, this state which is now illustrated on the left in FIG. 4 has to be assumed.

For the purpose of disengagement, the coil 48 is energized again (I>0 in the central diagram in FIG. 4). The direction of the flow is preferably reversed here (i.e. to be more precise I<0). As a result, the magnetic field of the coil 48 penetrates the field of the permanent magnet 58 in the second magnetic circuit 112 (shunt circuit) so that the magnetic holding force between the pole element 66 and the armature section 68 is lost. The spring 32 then presses the sliding sleeve 22 in the direction of the open position. In this context, a supporting, second magnetic force 116 is generated across the second magnetic circuit 112. This is achieved in particular by virtue of the fact that in the closed position a rear section of the armature section 68 is spaced apart axially from the second annular limb 54. As a result, a force with an axial component in the direction of the second magnetic force 116 is generated across the second magnetic circuit 112 between the second annular limb 54 and the armature section 68.

Finally, in the disengaged state, the sliding sleeve 22 comes to abut against a shoulder of the guide sleeve 20 (cf. FIG. 1). The current can then be switched off (I=0, right-hand diagram in FIG. 4). The sliding sleeve 22 is then held in the disengaged state by the spring 32. This is assisted by the second magnetic circuit 112, which is maintained by the permanent magnet 58. However, axial forces between the fixed system and the rotating system of the clutch arrangement 10 approach zero here. However, if an attempt is made to move the sliding sleeve 22 in the closing direction, an axial force 116 then develops again so that the sliding sleeve 22 is also held in the disengaged position by means of the second magnetic circuit 112.

Figure 5:
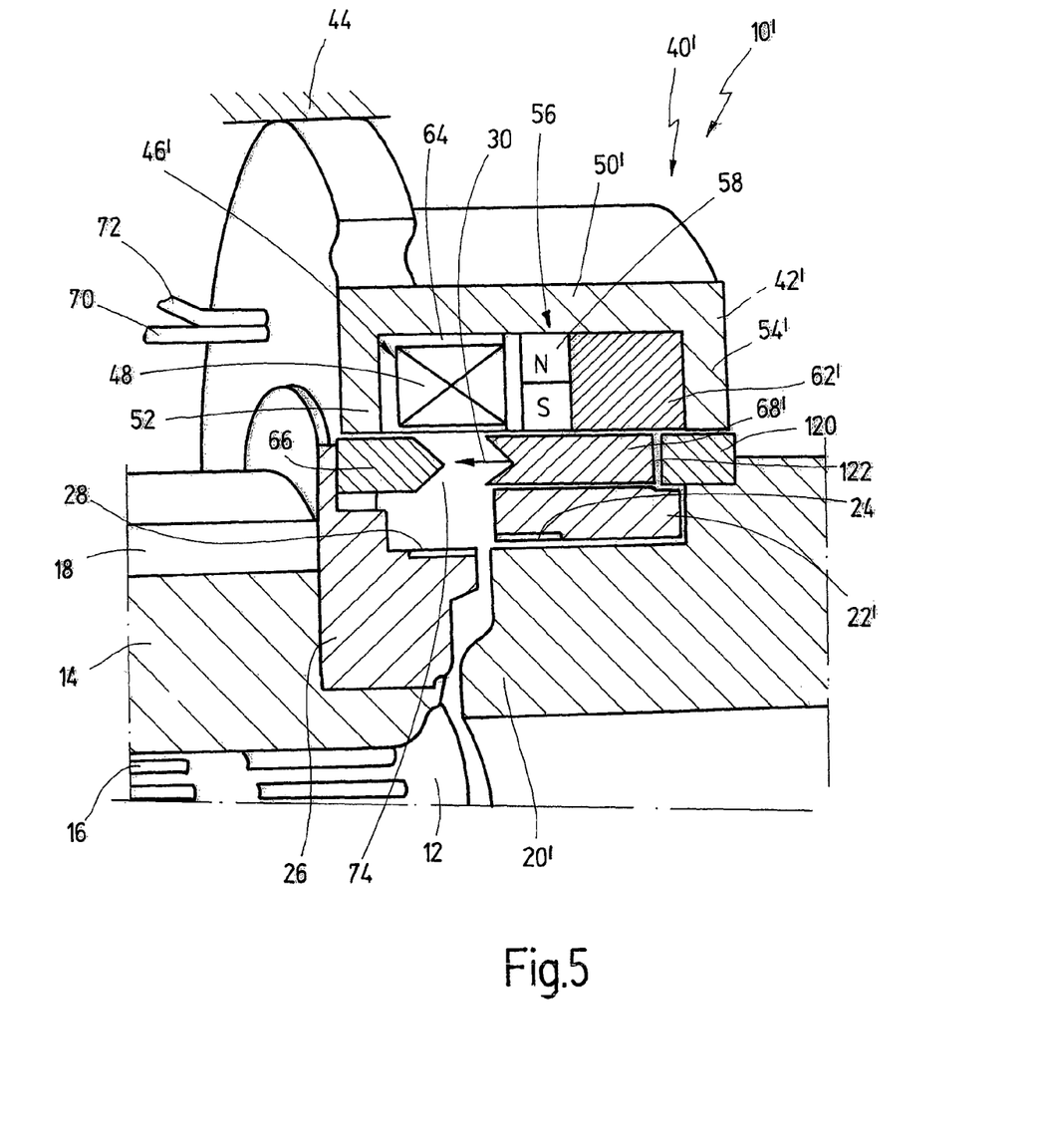
FIG. 5 shows a perspective schematic part-sectional view through a clutch arrangement according to an alternative embodiment of the present invention.

In FIG. 5 an alternative embodiment of a clutch arrangement is denoted in a general way by 10'.

The clutch arrangement 10' corresponds in terms of design and in terms of function to the clutch arrangement 10 in FIG. 1. Identical elements are therefore provided with identical reference symbols. In the text which follows, details will only be given on the differences.

While the sliding sleeve 22 of the clutch arrangement 10 is prestressed in the opposite direction to the engagement direction (by means of the spring 32), the sliding sleeve 22' of the clutch arrangement 10' is prestressed in neither direction.

The magnet housing 42' is embodied in the actuator arrangement 40' in such a way that the axial annular web 50' is made somewhat longer so that the second radial annular limb 54' is spaced apart somewhat further from the permanent magnet 58. The intermediate space 62 is filled with a nonmagnetic medium.

A second pole element 120 is arranged radially inside the free end of the second annular limb 54'. The second pole element 120 is magnetically coupled to the second annular limb 54'. The second pole element 120 can preferably be connected to the shaft 12 in a rotationally fixed fashion. In this context, the second pole element 120 can, for example, be fixed to the guide sleeve 20, to a gear wheel which is fixedly connected to the shaft 12, or directly to the shaft 12, or can be formed in one piece with one of the aforesaid parts.

Figure 6:
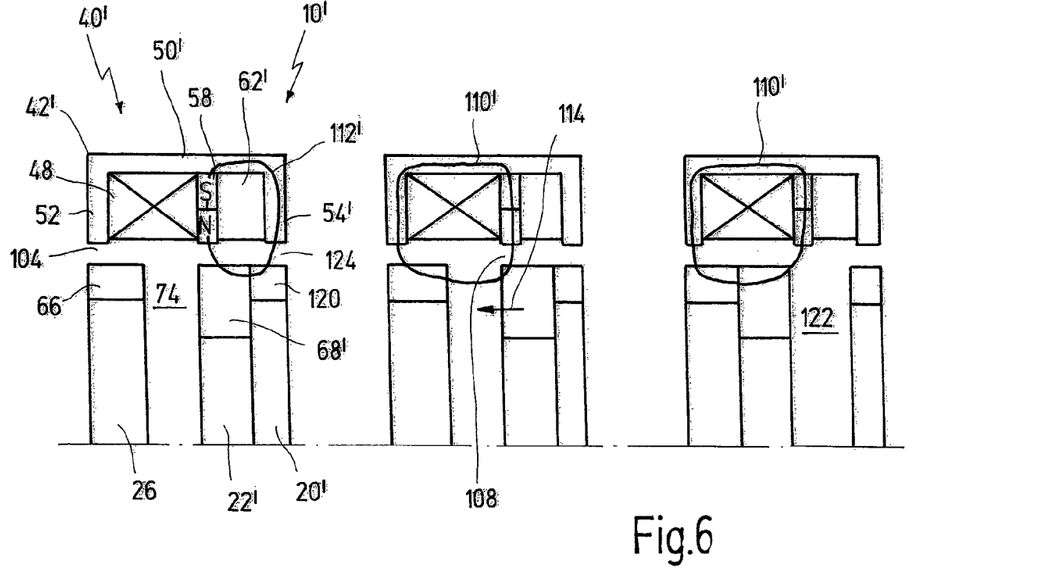
FIG. 6 shows three phases during the engagement of a gearspeed by means of the clutch arrangement in FIG. 5.

In this case, the second pole element 120 is magnetically coupled to the second annular limb 54' across a radial air gap 124 (see FIG. 6).

The magnetizable armature section 68' which is permanently connected to the sliding sleeve 22' can consequently be moved to and fro between the first pole element 66 and the second pole element 120. If the magnetizable armature section 68' bears against the first pole element 66, the sliding sleeve 22' is in the engaged state. In this case, a second axial air gap 122 is provided between the magnetizable armature section 68' and the second pole element 120.

If the magnetizable armature section 68' bears against the second pole element 120 (as shown in FIG. 5), a first axial air gap 74 is formed between the armature section 68' and the first pole element 66.

Figure 7:
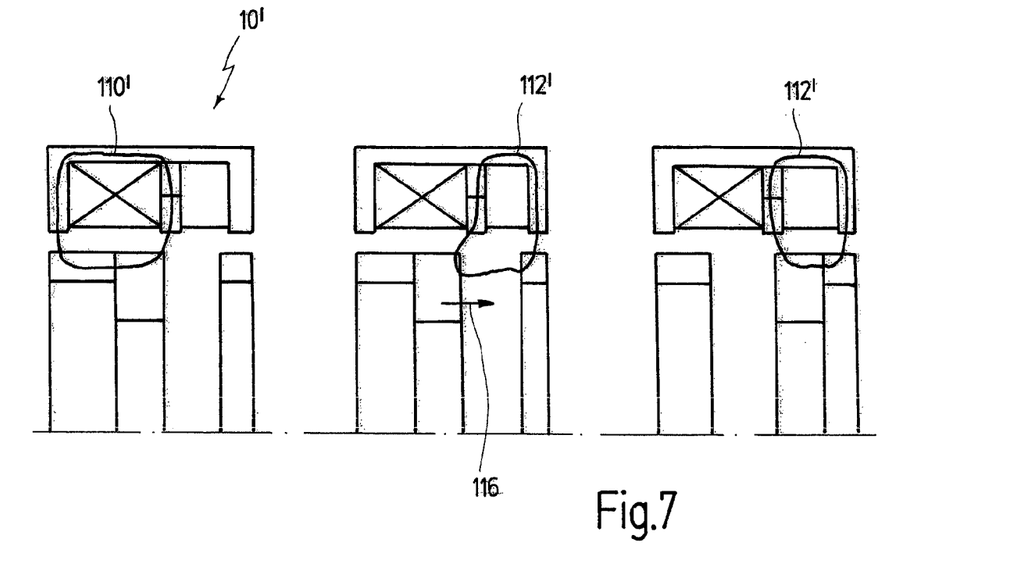
FIG. 7 shows three phases during the disengagement of a gearspeed by means of the clutch arrangement in FIG. 5.

From FIGS. 6 and 7 it is apparent that the sequences when engaging a gearspeed or when disengaging a gearspeed are generally comparable to the corresponding sequences in the clutch arrangement 10 in FIG. 1.

In the engaged state, in which the armature section 68' bears against the first pole element 66 (shown on the right in FIG. 6), a relatively large holding force can, however, be applied to the armature section 68'. In particular, there is no spring 32 present to prestress the sliding sleeve 22' in the opposite direction to the engagement direction.

When a gearspeed is disengaged (FIG. 7), the field of the permanent magnet 58 is forced into the second magnetic circuit 112' (shunt circuit) as a result of energization, in which context a magnetic flux which can apply relatively high force to the magnetic armature section 68' is present in the axial direction between the armature section 68' and the second pole element 120. The magnetic force 116 is sufficient to release the armature section 68' from the first pole element 66 even though there is no spring, which would prestress the sliding sleeve 22' in the disengagement direction, provided for the clutch arrangement 10' in FIGS. 5 to 7.

Overall, the mechanical design of the clutch arrangement 10' can be simplified compared to the clutch arrangement 10 in FIG. 1. The second pole element 120 can be integrated comparatively easily in a way which is fixed with respect to the shaft, for example it can be integrated into a shaft assembly.

In the engaged state (on the right in FIG. 6), the full magnetic force is available for the holding function and the force of the spring 32 is not subtracted from it, as in the case of the clutch arrangement 10. However, during the disengagement (FIG. 7), a somewhat smaller force is available since the force component of the spring 32 is missing.

The permanent magnet 58 may be constructed from block magnets which are fixed, for example bonded, to the carrier 60. The magnetization in the radial direction can occur after the bonding process.

Figure 8:
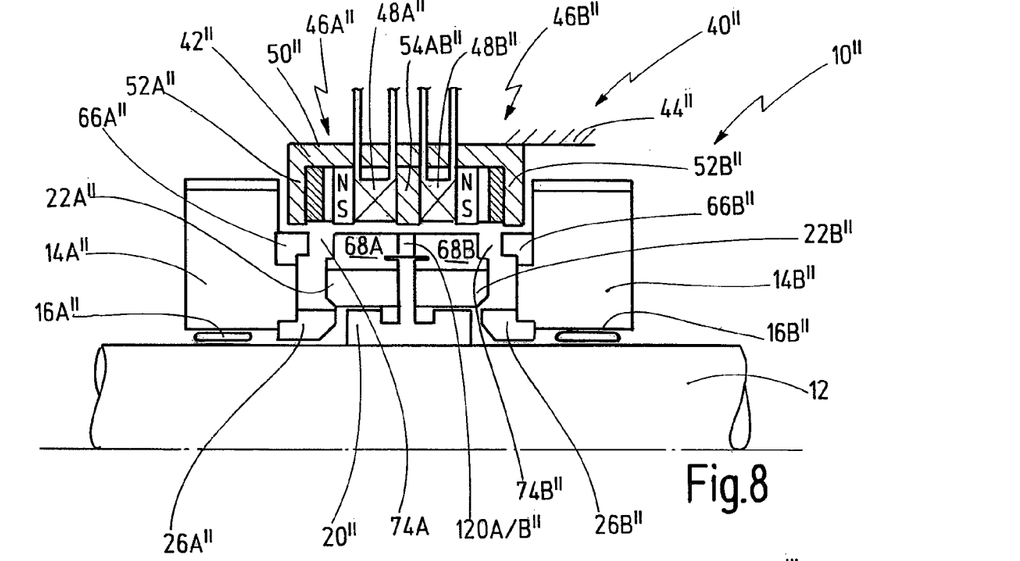
FIG. 8 shows a schematic view of a longitudinal section through a clutch assembly with two clutch arrangements which each correspond in terms of their design to one of the clutch arrangements in FIGS. 1 to 7, with the clutch arrangements having a common magnet housing with a common annular limb.

FIG. 8 shows a schematic axial sectional view through a clutch assembly 10" with two clutch arrangements which activate respective sliding sleeves 22A", 22B".

The two clutch arrangements of the clutch assembly 10" can each be of essentially the same design as the clutch arrangements which are shown in FIGS. 1 to 7.

It is generally conceivable to arrange these clutch arrangements axially one next to the other in order to form a clutch assembly. The clutch assembly 10" is, however, distinguished by the fact that the magnet housings of the two clutch arrangements are integrated with one another.

The magnet housing 42" has three annular limbs 52A", 54A/B" and 52B".

Between one 52A" of the radial annular limbs and the central, "common" annular limb 54A/B", the electromagnet arrangement 46A" of the first clutch arrangement is arranged. The electromagnet arrangement 46B" of the second clutch arrangement is arranged between the central annular limb 54A/B" and the annular limb 52B" at the other axial end.

A "common" second pole element 120A/B" is arranged radially inside the central annular limb 54A/B" and is fixed to the guide sleeve 20". The guide sleeve can, for example, be embodied with an axial division so that the second pole element 120A/B" can be held between the resulting parts.

The components of the two clutch arrangements are provided with the same reference symbols as the clutch arrangements in FIGS. 1 to 7. For one of the clutch arrangements, the suffix "A" has been selected and the suffix "B" has been selected for the other.

In order to prevent the two gearspeeds of the clutch assembly 10" from being engaged simultaneously, an electrical and/or a mechanical lock (securing means) is preferably provided.

The rest of the general design and the general method of functioning of the two clutch arrangements of the clutch assembly 10" corresponds otherwise to the design and the function of the clutch arrangements in FIGS. 1 to 7, so that they will not be presented once more here.

Figure 9:
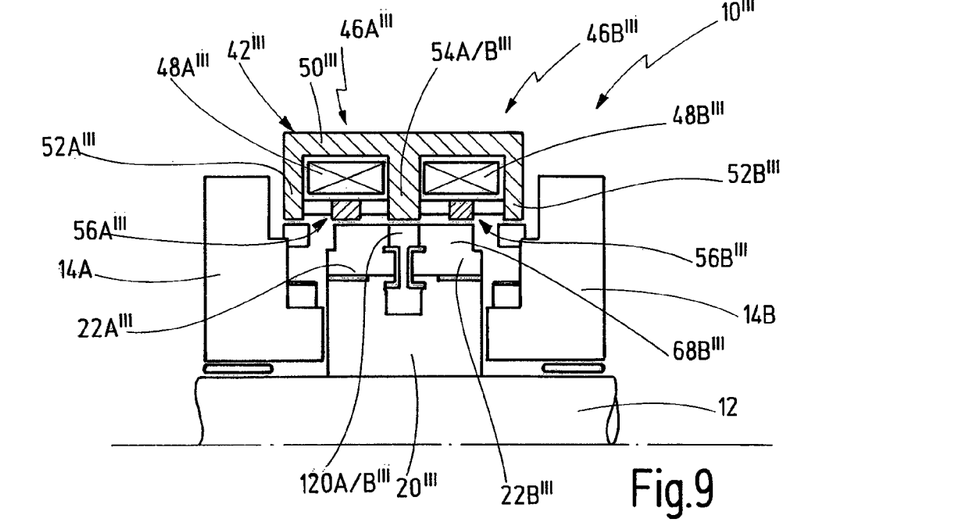
FIG. 9 is a schematic view of a longitudinal section through a further embodiment of a clutch assembly according to the invention with two clutch arrangements which each have two axially magnetized permanent magnets and an intermediate section arranged between them.

FIG. 9 shows a further alternative embodiment of a clutch assembly 10''' which has in turn two clutch arrangements.

The clutch arrangements of the clutch assembly 10''' are in turn of identical design to one another and they share a common magnet housing 42''' which, similarly to the housing 42", has three radial annular limbs 52A''', 54A/B''' and 52B''', and a common second pole element 120A/B".

The clutch arrangements of the clutch assembly 10''' however differ from the clutch arrangements in FIGS. 1 to 8 in that each clutch arrangement has two axially magnetized permanent magnets instead of one radially magnetized permanent magnet.

Figure 10:
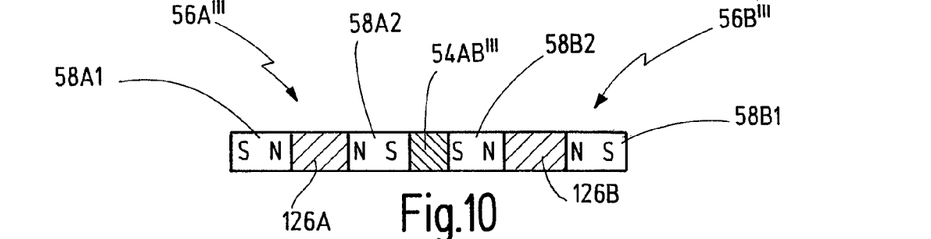
FIG. 10 shows a view of a detail of FIG. 9 with an illustration of the permanent magnets and intermediate sections.

This is illustrated in detail in FIG. 10. The clutch arrangement therefore has, between the annular limbs 52A''', 54A/B''', a first axially magnetized permanent magnet 58A1 and a second axially magnetized permanent magnet 58A2 which are polarized opposite to one another. A soft-magnetic intermediate section 126A is arranged between the two permanent magnets 58A1, 58A2. In the illustration in FIG. 10, the north poles of the permanent magnets 58A1, 58A2 are respectively arranged adjacent to the intermediate section 126A. However, it is self-evident that this polarity can also be interchanged.

The permanent magnet arrangement 56B''' of the second clutch arrangement has an identical structure, with two permanent magnets 58B1, 58B2 between which a soft-magnetic intermediate section 126B is arranged.

In addition, from FIG. 9 it is apparent that the electromagnet arrangements 46A''', 46B''' each have a coil arrangement 48A''', 48B''' which, viewed in the radial direction, are arranged outside the permanent magnet arrangements 56A''' and 56B''', respectively. The cross section of the coil arrangements can therefore be maximized between the two respective annular limbs.

The rest of the design of the clutch arrangements of the clutch assembly 10''' can essentially correspond to the design of the previously described clutch arrangements. It is possible for the armature section 68" which is connected to the respective sliding sleeve 22''' to be prestressed into a central position (corresponding springs are not illustrated in FIG. 9), or for the central position to be implemented on the basis of the symmetrical holding forces of the permanent magnets of the two clutch arrangements.

The method of functioning of the clutch arrangements of the clutch assembly 10''' is explained below with reference to FIGS. 11 and 12 and using the example of the clutch arrangement with the suffix "A". It is self-evident that the method of functioning of the other clutch arrangement is identical.

Figure 11:
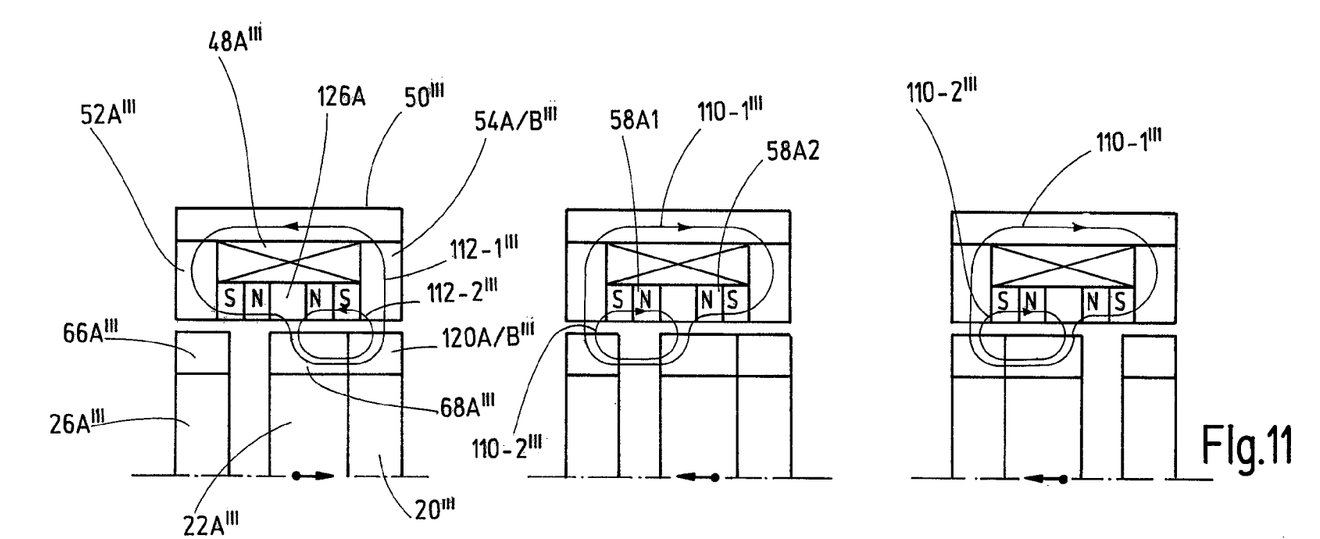
FIG. 11 shows three phases during the engagement of a gearspeed by means of one of the clutch arrangements of the clutch assembly in FIG. 9.

FIG. 11 illustrates three phases during engagement of an assigned gearspeed by means of the clutch arrangement which is shown. In a corresponding way, FIG. 12 shows the disengagement of the gearspeed with the same clutch arrangement.

It is clear from the left-hand illustration in FIG. 11 that the sliding sleeve 22A''' with the assigned, radially outer armature section 68A''' is located in a neutral position, that is to say for example in the central position (illustrated in FIG. 9) of the clutch assembly 10'''.

In this context, the armature section 68A''' is held against the second pole element 120A/B''' of the guide sleeve 20'''. This is effected by means of the magnetic force of the two permanent magnets 58A1, 58A2. To be more precise, a first magnetic holding circuit 112-1''' is set up between the pole element 120A/B''', the armature section 68A''', the magnetic intermediate section 126A, the first axially magnetized permanent magnet 58A1, the radial annular limb 52A''', the axial annular web 50''' and the other radial annular web 54A/B'''. In addition, a second magnetic holding circuit 112-2''' which is identical in the circumferential direction is set up across the second pole element 120A/B''', the armature section 68A''', the soft-magnetic intermediate section 126A, the second permanent magnet 58A2 and the second radial annular limb (central annular limb) 54A/B'''.

In other words, the magnetic forces of the two permanent magnets 58A1, 58A2 can be combined with one another or added to one another in order to hold the sliding sleeve 22A''' in the closed or open position when the coil arrangement 48A''' is not excited.

In the central diagram in FIG. 11, the coil arrangement 48A''' is then excited so that a magnetic circuit 110-1''' is formed which is in the opposite direction to the magnetic holding circuits 112-1''', 112-2'''. To be more precise, the magnetic circuit 110-1''' which is induced through the coil arrangement 48A''' extends across the axial angular web 50''', the annular limb 54A/B''', the second permanent magnet 58A2, the intermediate section 126A, the armature section 68A''', the pole element 66A''' and the second annular limb 52A'''.

In addition, owing to this reversal of the magnetic flux across the magnet housing, a second magnetic circuit 110-2''' is set up which extends across the first permanent magnet 58A1, the intermediate section 126A, the armature section 68A''', the pole element 66A''' and the annular limb 52A'''. In other words, the permanent magnets 58A1, 58A2 are used to assist the process of movement of the sliding sleeve 22''' when the coil arrangement 48A''' is energized.

The sliding sleeve 22A''' with the armature section 68A''' consequently moves to the left in FIG. 11 so that the sliding sleeve 22A''' and the coupling element 26A''' engage in order to connect the shaft to the assigned freely moving wheel.

The holding circuits 110-1''', 110-2''' maintain their direction here even after the coil arrangement 48A''' is no longer supplied with electrical energy, as is illustrated on the right in FIG. 11. Accordingly, the sliding sleeve 22A''' is held in the closed position, specifically using the magnetic forces of both permanent magnets 58A1, 58A2.

Figure 12:
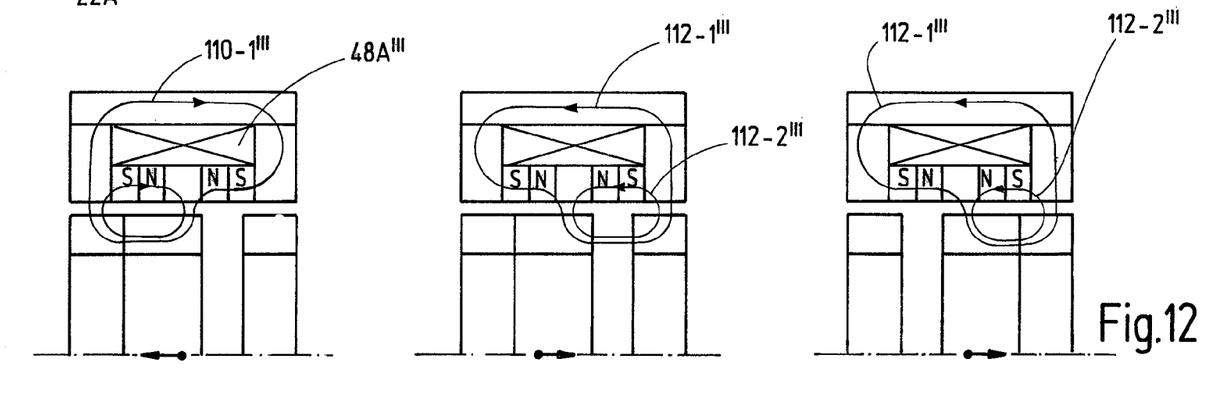
FIG. 12 shows three phases during the disengagement of a gearspeed by means of the clutch arrangement in FIG. 9.

FIG. 12 shows the corresponding process when the gearspeed is disengaged. The left-hand illustration in FIG. 12 corresponds here to the right-hand illustration in FIG. 11. In the central illustration in FIG. 12, the coil arrangement 48A''' is supplied with electrical energy, but in such a way that the direction of the magnetic flux is in turn reversed. As a result, the circuits 112-1''' and 112-2''' are in turn set up so that axial forces are applied to the armature section 68A''' across the axial air gap between the armature section 68A''' and the pole element 120A/B''', so that the sliding sleeve 22A''' is moved in the direction of the open position which is reached in the right-hand illustration in FIG. 12. The right-hand illustration in FIG. 12 corresponds in turn to the left-hand illustration in FIG. 11 and shows how the magnetic holding circuits 112-1''', 112-2''' ensure that the sliding sleeve 22A''' remains in the open position shown even without excitation of the coil arrangement 48A'''.

What is claimed is:

1. A clutch arrangement for a motor vehicle transmission, for connecting a shaft to a rotational element which is mounted thereon, wherein the clutch arrangement comprises:
   a sliding sleeve which is connected in a rotationally fixed fashion to the shaft and is mounted in an axially displaceable fashion on the shaft between a closed position and an open position and has a first sliding toothing;
   a clutch element which is connected in a rotationally fixed fashion to the rotational element and has a second sliding toothing into which the first sliding toothing can be inserted axially in the closing direction in order to connect the rotational element to the shaft in the closed position; and
   an actuator arrangement for axially sliding the sliding sleeve;
   wherein the actuator arrangement has an electromagnet arrangement which can be actuated in order to slide the sliding sleeve axially, wherein the electromagnet arrangement has a permanent magnet arrangement and a magnet housing which are arranged in such a way that with a magnetizable armature section of the sliding sleeve in at least one of the closed and open position they can form a magnetic circuit by means of which the sliding sleeve is held axially, wherein the magnet housing and the permanent magnet arrangement are fixed to a housing of the motor vehicle transmission.

2. The clutch arrangement as claimed in claim 1, wherein the permanent magnet arrangement has an annular, radially magnetized permanent magnet.

3. The clutch arrangement as claimed in claim 1, wherein the permanent magnet arrangement has an axially magnetized permanent magnet.

4. The clutch arrangement as claimed in claim 3, wherein the permanent magnet arrangement has two axially magnetized permanent magnets which are oppositely poled.

5. The clutch arrangement as claimed in claim 4, wherein a soft-magnetic intermediate section is arranged between the two axially magnetized permanent magnets.

6. The clutch arrangement as claimed in claim 1, wherein the magnet housing is of annular design and has two radially inwardly directed annular limbs between which the permanent magnet arrangement is arranged.

7. The clutch arrangement as claimed in claim 6, wherein an intermediate space which is filled with a nonmagnetic medium is arranged between an annular limb and a permanent magnet of the permanent magnet arrangement.

8. The clutch arrangement as claimed in claim 7, wherein the permanent magnet arrangement has a nonmagnetic carrier to which the permanent magnet is fixed, wherein the carrier is arranged in the intermediate space.

9. The clutch arrangement as claimed in claim 6, wherein a coil arrangement of the electromagnet arrangement is arranged between the two annular limbs.

10. The clutch arrangement as claimed in claim 7, wherein a coil arrangement of the electromagnet arrangement is arranged between the two annular limbs, and the permanent magnet is arranged between the coil arrangement and the intermediate space.

11. The clutch arrangement as claimed in claim 9, wherein the coil arrangement is arranged offset in the radial direction with respect to the permanent magnet arrangement between the two annular limbs.

12. The clutch arrangement as claimed in claim 9, wherein the coil arrangement is arranged offset in the axial direction with respect to the permanent magnet arrangement between the two annular limbs.

13. The clutch arrangement as claimed in claim 6, wherein an annular limb is magnetically coupled across a first radial air gap to a first pole element which is fixed to the clutch element.

14. The clutch arrangement as claimed in claim 13, wherein the first pole element is magnetically coupled across a first axial air gap to an armature section which is fixed to the sliding sleeve.

15. The clutch arrangement as claimed in claim 6, wherein an annular limb is magnetically coupled across a second radial air gap to an armature section which is fixed to the sliding sleeve.

16. The clutch arrangement as claimed in claim 6, wherein an annular limb is magnetically coupled to a second pole element which is magnetically coupled across a second axial air gap to an armature section which is fixed to the sliding sleeve.

17. The clutch arrangement as claimed in claim 16, wherein the second pole element is connected in a rotationally fixed fashion to the shaft and is magnetically coupled across a radial air gap to the annular limb.

18. The clutch arrangement as claimed in claim 1, wherein a permanent magnet of the permanent magnet arrangement is magnetically coupled across a third radial air gap to an armature section which is fixed to the sliding sleeve.

19. The clutch arrangement as claimed in claim 1, wherein a soft-magnetic intermediate section which is arranged between two permanent magnets of the permanent magnet arrangement is magnetically coupled across a third radial air gap to an armature section which is fixed to the sliding sleeve.

20. The clutch arrangement as claimed in claim 1, wherein the electromagnet arrangement is configured to set up a first and a second magnetic circuit, wherein, when the first magnetic circuit is set up, a first magnetic force is applied to an armature section of the switching sleeve and said magnetic force slides the sliding sleeve in the closing direction.

21. The clutch arrangement as claimed in claim 20, wherein, when the second magnetic circuit is set up, a second magnetic force is applied to an armature section of the sliding sleeve, and said magnetic force slides the sliding sleeve in the opposite direction to the closing direction.

22. The clutch arrangement as claimed in claim 4, wherein the electromagnet arrangement is configured to set up, in at least one of the closed and open position of the sliding sleeve, a first magnetic holding circuit by means of one of two permanent magnets and at the same time a parallel second magnetic holding circuit by means of the second permanent magnet.

23. A clutch assembly having a first and a second clutch arrangement, wherein each clutch arrangement comprises:
   a sliding sleeve which is connected in a rotationally fixed fashion to the shaft and is mounted in an axially displaceable fashion on the shaft between a closed position and an open position and has a first sliding toothing;
   a clutch element which is connected in a rotationally fixed fashion to the rotational element and has a second sliding toothing into which the first sliding toothing can be inserted axially in the closing direction in order to connect the rotational element to the shaft in the closed position; and an actuator arrangement for axially sliding the sliding sleeve; wherein the actuator arrangement has an electromagnet arrangement which can be actuated in order to slide the sliding sleeve axially, wherein the first clutch arrangement is configured to connect the shaft by means of a first sliding sleeve to a first rotational element, and wherein the second clutch arrangement is configured to connect the shaft to a second rotational element by means of a second sliding sleeve, wherein the electromagnet arrangements each have a permanent magnet arrangement and a magnet housing which are arranged in such a way that with a magnetizable armature section of the respective sliding sleeve in at least one of the closed and open position they can form a magnetic circuit by means of which the respective sliding sleeve is respectively held axially, wherein the magnet housings are embodied in an annular fashion and have two radially inwardly directed annular limbs between which the permanent magnet arrangements are arranged, wherein the magnet housings of the two clutch arrangements share at least one of a common annular limb and a second pole element.

24. A method for engaging a gearspeed of a transmission by axially sliding a sliding sleeve with respect to a clutch element by means of an electromagnet arrangement, wherein the electromagnet arrangement has a magnet housing, an electric coil arrangement and a permanent magnet, having the steps of energizing the coil arrangement so that a first magnetic circuit is set up across the magnet housing, the permanent magnet, a magnetizable armature section of the sliding sleeve, a first pole element of the clutch element and an axial air gap between the armature section and the first pole element, and of reducing the energization when or after the air gap closes, wherein the permanent magnet maintains a magnetic holding flux across the first magnetic circuit in order to hold the sliding sleeve axially in the engaged position, wherein the sliding sleeve is prestressed in the opposite direction to the engagement direction by means of a mechanical energy store.

25. A method for disengaging a gearspeed of a transmission by axially sliding a sliding sleeve with respect to a clutch element by means of an electromagnet arrangement, wherein the electromagnet arrangement has a magnet housing, an electric coil arrangement and a permanent magnet, and wherein the sliding sleeve is held axially by means of a holding flux which is generated by the permanent magnet across a first magnetic circuit, having the step of energizing the coil arrangement so that a resulting flux is formed in a second magnetic circuit which is set up across the magnet housing, the permanent magnet and a magnetizable armature section of the sliding sleeve and by means of which the sliding sleeve can be held axially in the disengaged position, wherein the sliding sleeve is slid into the disengaged position by means of a magnetic force, and said sliding sleeve acts across an axial air gap between the magnetizable armature section and a second pole element which is magnetically coupled to a limb of the magnet housing.

26. The method as claimed in claim 25, wherein the sliding sleeve is slid into the disengaged position by means of a magnetic force which acts across a radial air gap between the magnetizable armature section and a limb of the magnet housing.

27. A method for engaging a gearspeed of a transmission by axially sliding a sliding sleeve with respect to a clutch element by means of an electromagnet arrangement, wherein the electromagnet arrangement has a magnet housing, an electric coil arrangement and a permanent magnet, having the steps of energizing the coil arrangement so that a first magnetic circuit is set up across the magnet housing, the permanent magnet, a magnetizable armature section of the sliding sleeve, a first pole element of the clutch element and an axial air gap between the armature section and the first pole element, and of reducing the energization when or after the air gap closes, wherein the permanent magnet maintains a magnetic holding flux across the first magnetic circuit in order to hold the sliding sleeve axially in the engaged position, wherein the magnet housing and the permanent magnet are arranged fixed to the housing and are magnetically connected to the first pole element and to the armature section across respective radial air gaps.

* * * * *